UNITED STATES PATENT OFFICE.

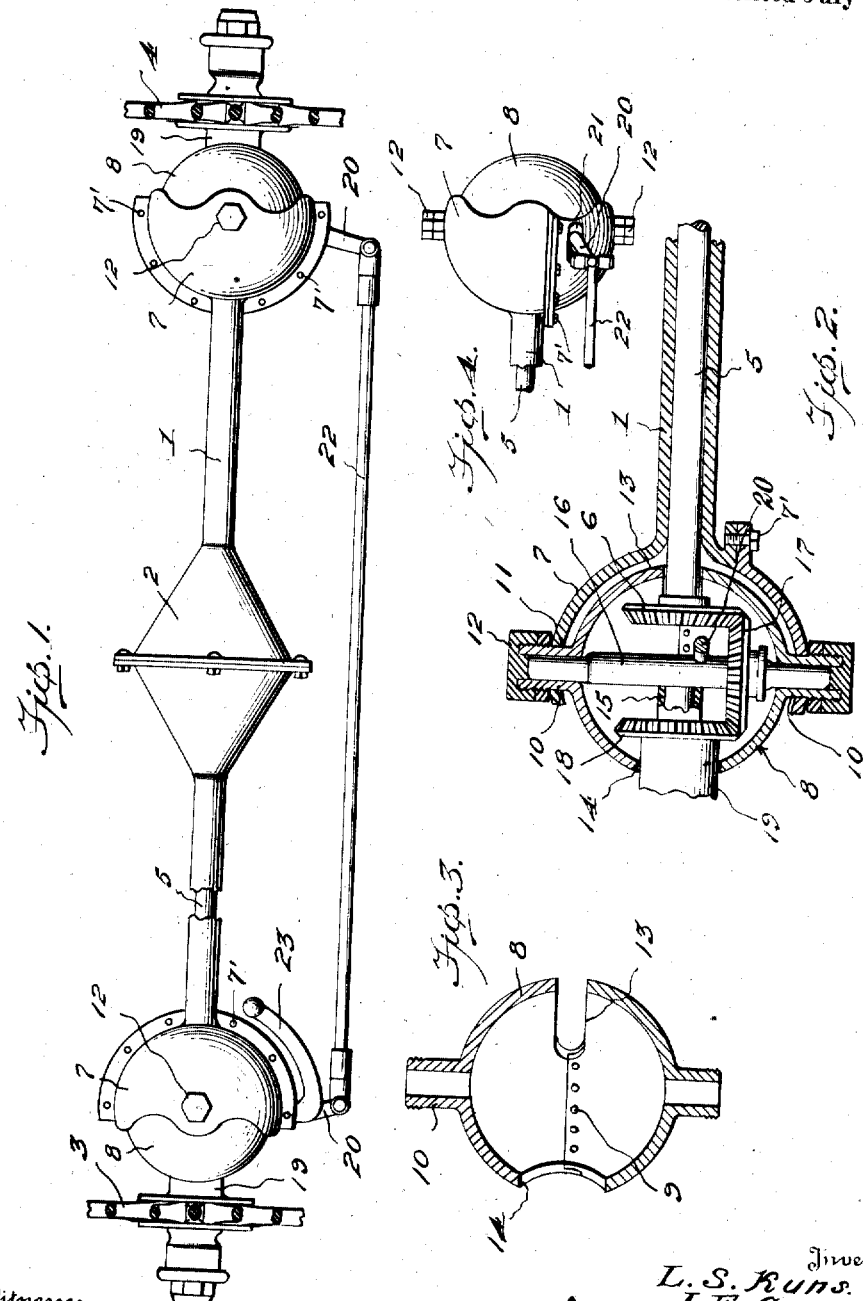

LLOYD S. KUNS AND JESSE E. CARTER, OF HOLTVILLE, CALIFORNIA.

AUTOMOBILE FRONT-WHEEL DRIVE MECHANISM.

1,232,335.

Specification of Letters Patent.

Patented July 3, 1917.

Application filed February 6, 1915. Serial No. 6,522.

*To all whom it may concern:*

Be it known that we, LLOYD S. KUNS and JESSE E. CARTER, citizens of the United States, residing at Holtville, in the county of Imperial and State of California, have invented certain new and useful Improvements in Automobile Front-Wheel Drive Mechanism; and we do hereby declare the following to be a full, clear, and exact description of the invention, such as will enable others skilled in the art to which it appertains to make and use the same.

Our invention relates to improvements in front wheel drive mechanism for automobiles and resides in the provision of simple and effective means that will operate to transmit power from the engine of an automobile to and drive the front wheel without in anyway interfering with the steering mechanism.

One of the principal objects of the invention is to provide novel means for connecting the front wheels with the driving power which is of simple construction, reliable and efficient in operation and capable of being made comparatively small.

Another object is to provide a casing for the means for connecting the wheel with the drive shaft, said casing being arranged to turn with the wheel during the steering operation and serving to protect the connecting means against the elements and dust.

Another object is to generally improve and simplify the construction and operation of front wheel drive mechanism of the character described so as to render it more practical, simple as to construction, efficient and reliable in operation and more capable of being readily attached to various makes of automobiles without materially increasing the cost of manufacture thereof.

The above and additional objects are accomplished by such means as are illustrated in the accompanying drawings, described in the following specification and then more particularly pointed out in the claim.

With reference to the drawings, wherein we have illustrated the preferred embodiment of our invention as it is reduced to practice, and throughout the several views of which similar reference numerals designate corresponding parts, Figure 1 is a plan view of the front axle of an automobile showing our invention attached thereto and a portion of the wheel, Fig. 2 is an enlarged longitudinal sectional view taken through a portion of the front axle showing the connecting gearing and a portion of one of the wheels in operative relation, Fig. 3 is a vertical sectional view of the casing, and Fig. 4 is a fragmentary side elevation of a portion of the axle, and the casing.

Referring to the drawings by characters of reference, 1 designates as an entirety the front axle which is enlarged centrally of its ends to provide a casing 2 for the differential gearing, not shown. Wheels 3 and 4 are operatively associated with the ends of the axle 1 and mounted within the axle which is hollow. On each side of the casing 2 is a rotatable drive shaft 5, upon the outer end of which is keyed a beveled cog gear 6. The outer ends of the axle are enlarged and shaped to form semi-spherical housings 7 in each of which is rotatably mounted a hollow spherical casing 8. The housing 7 is constructed of two parts and held together by suitable bolts 7' for assembling various parts, which will be hereinafter more fully described. The casing 8 is partially housed by the housing 7 and is formed of two semi-spherical sections, said sections being secured to one another by means of removable fastening elements 9. Formed integral with the casing 8 and extending outwardly from the upper and lower sides thereof are hollow cylindrical trunnions 10 that are extended through bearing openings 11 formed at opposite points in the upper and lower sides of the housing 7. The outer ends of the trunnions 10 are screw threaded and suitable nuts 12 are turned upon said outer threaded ends to secure the casing within the housing 7. The shafts 5 are extended through elongated openings 13 formed in the casings 8, and gears 6 on said shaft are thus incased.

Mounted within the casings 8 and extending outwardly therefrom through openings 14 formed in the casings at points opposite to the openings 13 are horizontal spindles 15 which at their inner ends carry vertical rotary shafts 16, the spindles being extended from the shafts centrally of the ends of said shafts. The ends of the shafts 16 are rotatably mounted within the hollow trunnions 10. A beveled cog gear 17 is loosely mounted upon the shaft 16 adjacent to the lower end of said shaft and meshes with the gears 6, also the beveled cog gear 18 which is carried upon the hub 19. The hub 19 is extended through the opening 14 into said casing so that the gear 18 may be secured to the hub and located for coöperation with the gear 17. The spindles 15 extend through the gears 18 and hub 19. Carried by the shafts 16 and extending outwardly at right angles therefrom are arms 20. These arms extend through the casings 8 and elongated openings 21 formed in the housings 7. A connecting rod 22 is pivotally connected at its ends with the outer ends of the arms 20.

A curved arm 23 is carried by one of the arms 20 and is to be connected with the steering mechanism, not shown, in any suitable manner.

The shaft 5 in rotating rotates the gears 6, 17, and 18 which gears are arranged to mesh with one another and since the gears 18 are fixed to the hubs 19 of the wheels 3 and 4, said wheels will be rotated. Upon movement of the arm 23, the arms 20 are correspondingly moved and rotate the shaft 16. The casings 8 rotate with the shaft 16. This rotation of the casing 8 is permitted by the elongated openings 13 which receive the shaft 5. The openings 14 for the hubs 19 of the wheels 3 and 4 are of just sufficient size preferably to receive said hubs, thus when the shafts 16 are rotated the spindles 15 are moved and the wheels 3 and 4 turned accordingly. The casings 8 protect the gears from the elements and prevent dust or other foreign matter getting into the casings and clogging the gears. In having the casings 8 made in sections and the sections secured by removable fastening elements 9 the casing may be quickly and easily assembled around the gearing. By providing the housings 7 the device is strengthened and can be arranged in comparatively small space.

In practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as claimed.

What is claimed is:—

An automobile front wheel drive mechanism comprising a hollow axle provided with its outer ends enlarged to form semispherical housings, said housings provided with oppositely disposed openings, semispherical casings provided with oppositely disposed hollow trunnions extending through the openings in the housings, vertically extending shafts journaled in the trunnions, nuts threaded to the ends of the trunnions forming bearings for the ends of the vertically extending shafts, gears secured to the vertically extending shafts, said casings provided with openings in one side and slots in the other side thereof, a drive shaft journaled in the axle and extending through the slots of the casings, gears secured to the ends of the drive shaft and in mesh with first mentioned gears, hubs extending through the openings in the casings, gears secured to the hubs and in mesh with first mentioned gears, and steering means extending through the housings and casings and secured to the vertically extending shafts for turning the hubs.

In testimony whereof we affix our signatures in presence of two witnesses.

LLOYD S. KUNS.
JESSE E. CARTER.

Witnesses:
R. W. Hoover,
O. N. Shaw.